Jan. 9, 1968     S. B. KNUDTSON     3,362,379
DEVICE FOR DETECTING AND FILLING VOIDS IN SIDE
EDGES OF PLYWOOD SHEETS OR THE LIKE
Filed Oct. 15, 1964     4 Sheets-Sheet 1

INVENTOR.
STANLEY B. KNUDTSON
BY
Kimmel & Crowell
ATTORNEYS.

INVENTOR.
STANLEY B. KNUDTSON
BY
Kimmel & Crowell
ATTORNEYS.

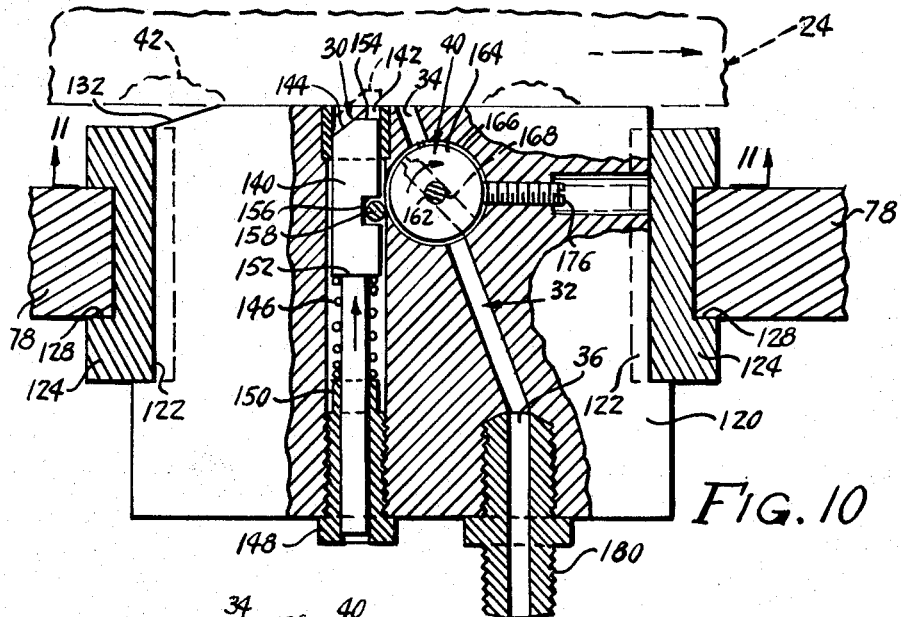
Fig. 10
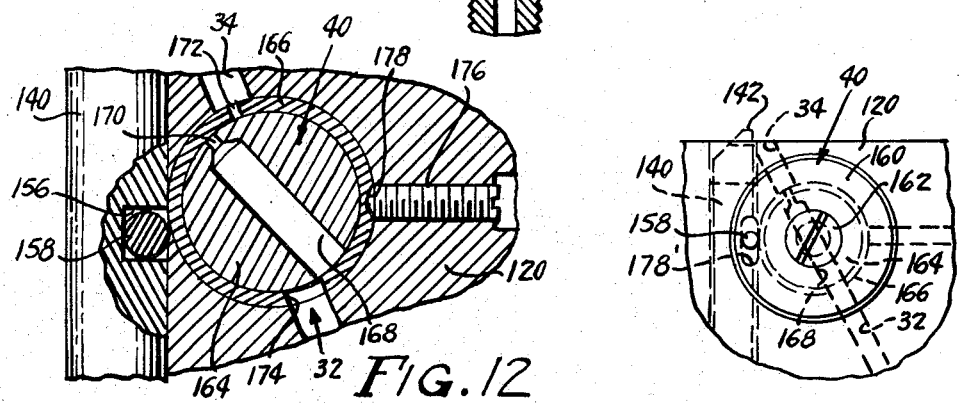
Fig. 12
Fig. 13
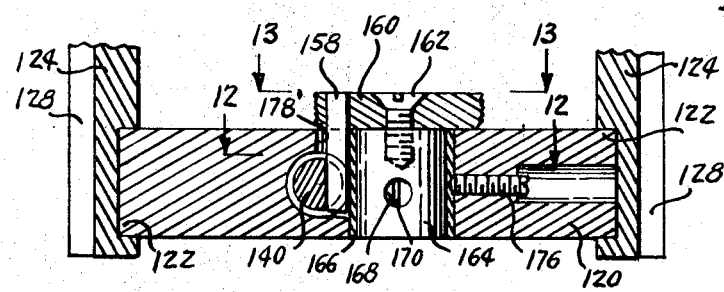
Fig. 11
INVENTOR.
STANLEY B. KNUDTSON
BY Kimmel & Crowell
ATTORNEYS.

United States Patent Office 3,362,379
Patented Jan. 9, 1968

3,362,379
DEVICE FOR DETECTING AND FILLING VOIDS IN SIDE EDGES OF PLYWOOD SHEETS OR THE LIKE
Stanley B. Knudtson, 1920 Highway 99 S., Junction City, Oreg. 97448
Filed Oct. 15, 1964, Ser. No. 403,995
5 Claims. (Cl. 118—8)

ABSTRACT OF THE DISCLOSURE

Apparatus engageable by the traveling edges of a sheet of plywood material to sense a void in the edge, the sensing means actuating a valve control for a source of filling material supplied through the apparatus to an outlet opening formed in the apparatus and located in advance of the sensing means relative to the sensing means and the direction of travel of the sheet and to effect a filling of the void as it passes the outlet opening.

---

This invention relates to a device for detecting and filling voids in side edges of plywood sheets or the like and more particularly to an automatic detection means to continuously monitor the side edges of a plywood sheet with feeding means responsive to the detection of a void for filling the same with a plastic wood material or the like.

A primary object of this invention is the provision of a device of the type described which is sturdy and durable in construction, reliable and efficient in operation, and relatively simple and inexpensive to manufacture, utilize and maintain.

Another object of this invention is to provide a device for detecting and filling voids in side edges of plywood or other similar sheets which is substantially instantaneously actuated by passage of a void to feed a quantity of filling material thereinto.

Another object of this invention is to provide a machine for detecting and filling voids which will receive a plywood sheet or the like directly from the sander or other similar apparatus whereby no separate transporting means are necessary.

A further object of the instant invention is the provision of detection and filling means along both side edges of a plywood sheet so spaced as to accommodate each intermediate ply of the same.

A still further object of this invention is to provide a support means in combination with a device for detecting and filling voids in the side edges of a sheet of plywood or the like which may be adjusted to accommodate major changes in width of the sheet material and which includes resilient means to allow for accommodation of minor variations in the width of a particular sheet.

Another object of the instant invention is the provision of novel means to render a valve structure responsive to the detection of a void in the side edge of a plywood sheet which is accurate and efficient to automatically plug a gap with wood filler compound or the like while precluding undesirable loss of the filler compound.

Still another object of this invention is the provision of means to hold the edges of the plywood sheet in a desired position in order that the detector means may accurately monitor individual plies thereof.

Other and further objects reside in the combination of elements, arrangement of parts, and features of construction.

Still other objects will in part be obvious and in part be pointed out as the description of the invention proceeds and as shown in the accompanying drawings wherein:

FIGURE 10 is an enlarged elevational view, partly in section, showing the details of the detection means and the valve assembly responsive thereto;

FIGURE 11 is a transverse cross-sectional view taken substantally on line 11—11 of FIGURE 10;

FIGURE 12 is a fragmentary cross-sectional view taken substantially on line 12—12 of FIGURE 11; and FIGURE 13 is a fragmentary plan view taken substantially along line 13—13 of FIGURE 11.

Similar reference characters refer to similar parts throughout the several views of the drawings.

Figure 1:
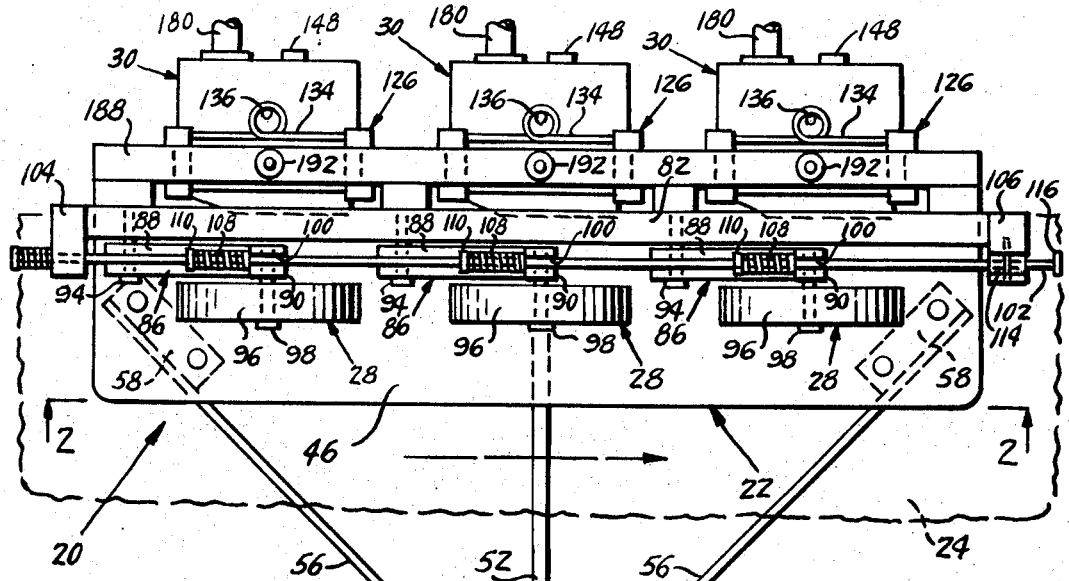
FIGURE 1 is a fragmentary top plan view of three combination detection and filling means in accordance with the instant inventive concept, a portion of a plywood sheet material being shown in dotted lines.
Figure 2:
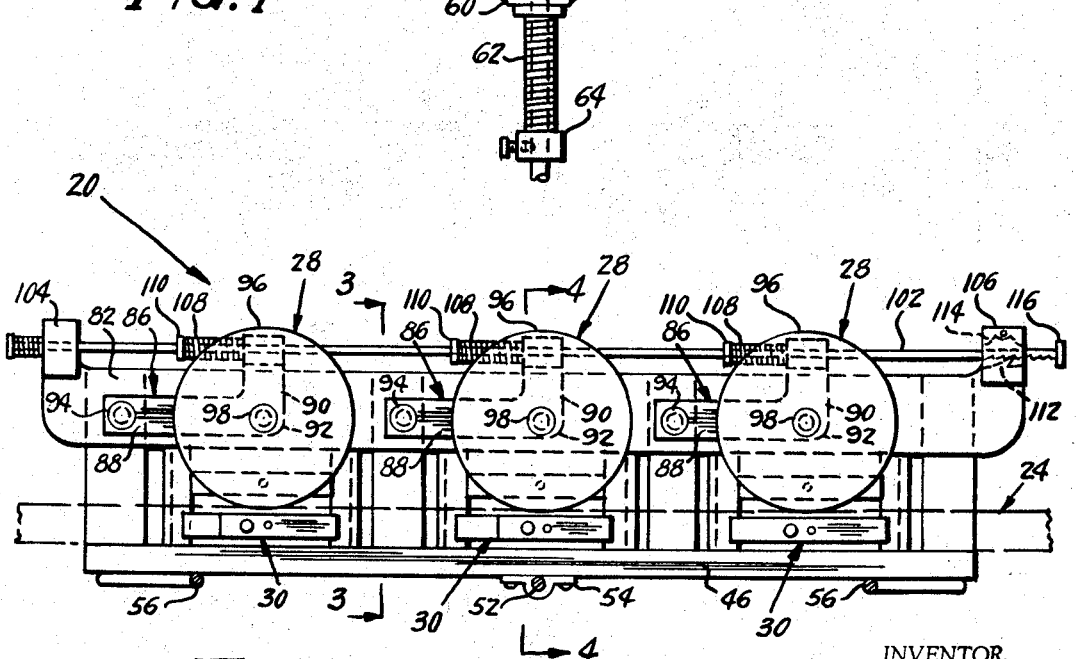
FIGURE 2 is a cross-sectional view taken substantially on line 2—2 of FIGURE 1.
Figure 3:
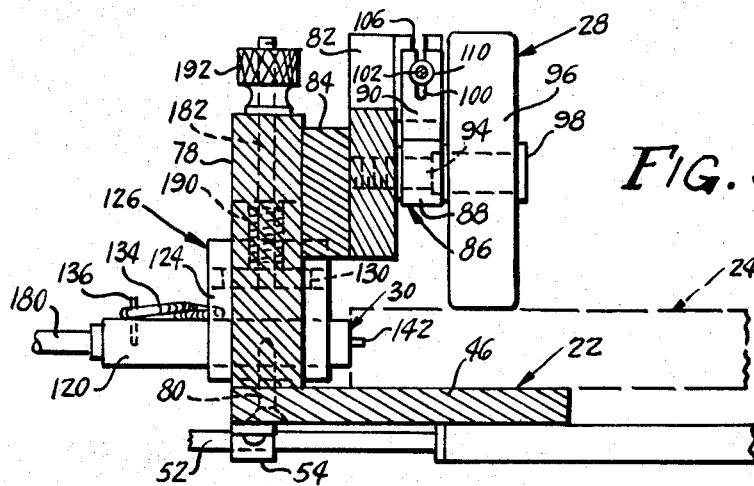
FIGURE 3 is an enlarged transverse cross-sectional view taken substantially on line 3—3 of FIGURE 2.
Figure 4:
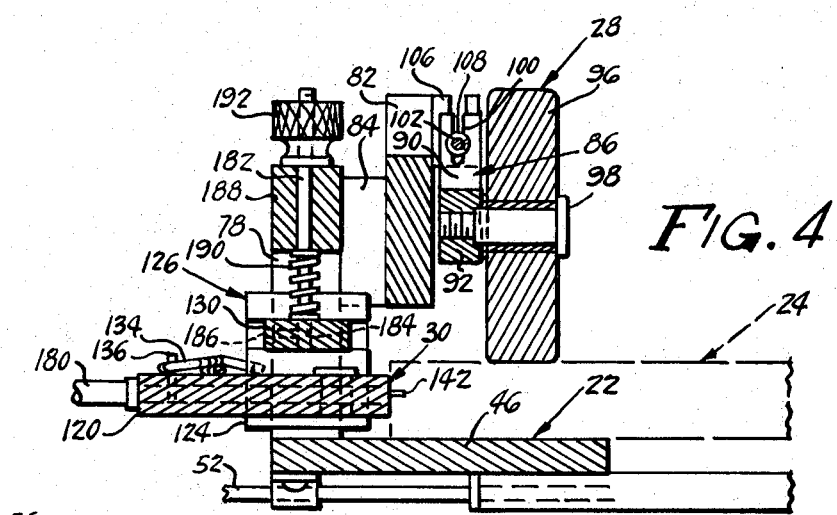
FIGURE 4 is an enlarged transverse cross-sectional view taken substantially on line 4—4 of FIGURE 2.
Figure 5:
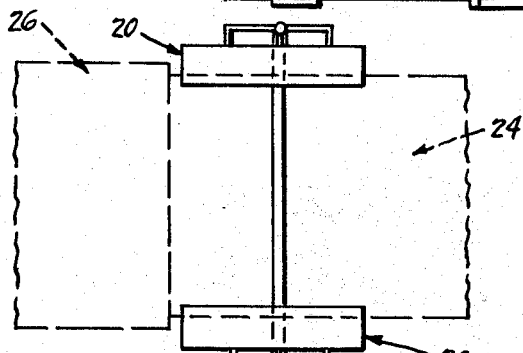
FIGURE 5 is a schematic plan view of the filling system, a press or sander feeding a sheet material being shown in dotted lines.
Figure 6:
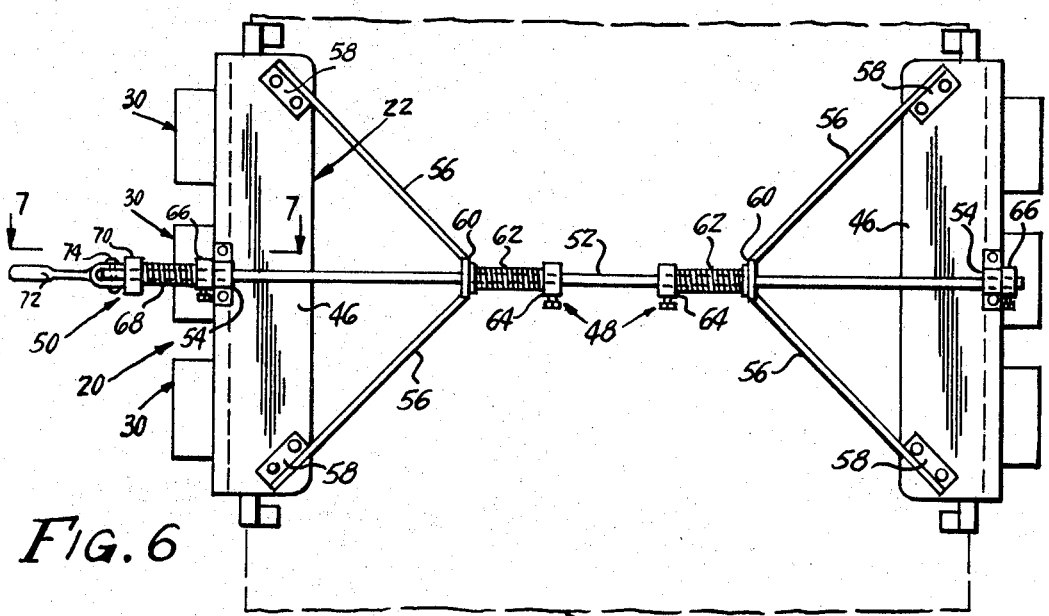
FIGURE 6 is a bottom plan view of the device of the instant invention.

Referring now to the drawings, a device for detecting and filling voids in accordance with the instant inventive concept is designated generally by the reference numeral 20 and comprises basically a support means 22, a portion of which slidingly receives a sheet of plywood material or the like 24 which may be propelled or transported by separate motive means (not shown) or which may be directly fed from a plywood press or sander schematically shown at 26 in FIGURE 5 to preclude the necessity of independently operated transporting means, hold down means 28 maintaining the side edges of the sheet 24 against the portion of the support means 22 over which it is urged, detection means 30 juxtaposed to individual plies along the side edges of the sheet 24, passageway means 32 having an outlet 34 aligned with, and in advance of, its associated detection means 30 in the direction of movement of the sheet 24, and an inlet 36 connected to a source 38 of filling material, valve means 40 interposed in the passageway means 32 between the outlet 34 and the inlet 36 and movable from a closed position shown particularly in FIGURES 10 and 12 to an open position shown in dotted lines in FIGURE 13 in response to the detection of a void 42 in the edge of the sheet 24 by the detection means 30, and feeding means in the form of a pump or the like 44 constantly delivering a quantity of the filling material to the inlet 36 of the passageway means 32.

Figure 7:
FIGURE 7 is a fragmentary sectional view taken substantially on line 7—7 of FIGURE 6.
Figure 8:
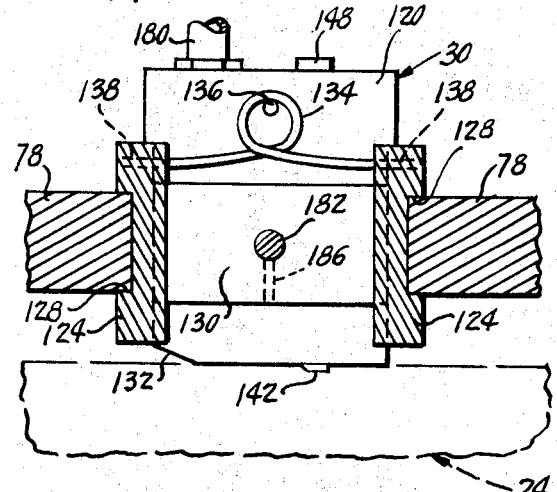
FIGURE 8 is an enlarged fragmentary cross-sectional view particularly showing the tensioning spring means normally urging the detection means head assembly toward the side edge of the plywood sheet.
Figure 9:
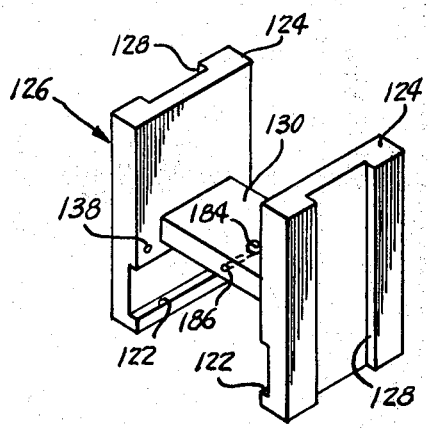
FIGURE 9 is an orthographic projection of the saddle utilized to carry the head assembly for the detection means.

The portion of the support means 22 over which the sheet 24 is urged includes a pair of spaced bed plates 46 underlying the side edges of the sheet 24. Adjustable means 48 are operatively secured to the bed plates 46 for varying the space between the same to accommodate major changes in width of the sheet 24, for example, to accommodate changes from a 3 foot sheet to a 4 foot sheet. Tensioning means 50 normally urge the bed plates 46 toward an adjusted spacing and provide resilience to allow for movement of the bed plates 46 to accommodate minor variations in the width of a particular sheet due to manufacturing irregularities or the like. The adjustable means 48 include a cross shaft 52 underlying the bed plates 46 and slidably receive through pillow blocks 54 carried thereby. Flat bars 56 are fixed at 58 in any conventional manner to the underside of the bed plates 46 and are secured to washers 60 circumscribing the cross shaft 52 and slidably engaging spring means 62 compressed against set collars 64 on the cross shaft 52. Additional set collars 66 are secured to the cross shaft 52 on opposite sides of the pillow blocks 54. A heavier spring means 68 abuts a slidable collar 70 on the cross shaft 52 with a tension lever 72 pivotally connected at 74 to the end of the cross shaft 52 and having a cam surface 76 adapted to compress the spring means 68 in the position shown in FIGURE 7. Major variations in the spacing between the bed plates 46 can be accomplished by presetting the two center set collars 64 to the desired width. Since the spring means 68 is heavier than the spring means 62, the bed plates 46 will be continually pressed toward the adjusted spacing without fully compressing the spring means 68. This allows for outward expansion of the bed plates 46 to accommodate slight fluctuations in the dimensions or movement of the panel or sheet 24.

A plurality of upstanding side frame members 78 are secured as by screws 80 to the outer edges of the bed plates 46 in spaced relationship. The hold down means 28 includes a support bar 82 fixed by spacers 84 to the side frame members 78 in juxtaposition and overlying each side edge of the sheet 24. A plurality of substantially L-shaped pivot arms 86 having substantially horizontally extending legs 88 and substantially vertically extending legs 90 meeting at vertices 92 are pivotally secured at 94 to the support bar 82 adjacent the end of the horizontally extending legs 88 remote from the vertices 92. Pressure wheels 96 are rotatably carried by axles 98 adjacent each vertex 92 in overlying relationship to the edges of the sheet 24. Slots 100 are defined in the end of the vertically extending legs 90 remote from the vertices 92 and a tension means including an elongated tension bar 102 is received in all of the slots 100 on one side of the sheet 24, the ends of the tension bar 102 being slidably supported in blocks 104, 106 carried by the support bar 82. Spring means 108 engage washers 110 immediately behind each vertically extending leg 90 on the tension bar 102 and normally urge the pressure wheels 96 downwardly about their pivotal supports 94 to hold down the side edges of the sheet 24. The tension bar may be adjusted by varying the position of the ratchet 112 in the support block 106, the ratchet being normally urged into a locked position by a tension spring 114 with a control knob 116 being provided to vary the adjustment of the ratchet 112.

Each detection means 30 includes a head assembly 120 slidingly received in slots 122 defined in vertical members 124 of saddle 126, additional slots 128 being provided in the vertical members 124 and slidably engaging side frame members 78, the saddle being completed by a spacing bar 130 connected the two vertical members 124. The head assembly 120 has a cammed rearward edge 132 in the direction of travel of the sheet 24 to facilitate positioning of the same on engagement with the leading edge of a sheet 24. A tension spring means 134 circumscribes a pin 136 carried by the head assembly 120 and has its opposite ends secured in bores 138 in the side members 124 of the saddle 126 to normally urge the head assembly 120 toward the side edge of the sheet 24. An actuating plunger 140 is slidably carried in the head assembly 120 and has one end 142 dimensioned to be received within a void 42 in the side edge of the sheet 24, an inclined cam surface 144 being provided on the rearward edge in the direction of movement of the sheet of the one end 142 of the actuating plunger 140 to retract the actuating plunger against the urging of spring means 146 as the void 42 in the edge of the sheet 24 passes by. The tension of the spring means 146 may be varied by rotation of the screw member 148 abutting bushing 150 urging the spring means 146 against shoulder 152 on the actuating plunger 140. The end 142 of the plunger 140 has shoulders 154 defined thereon to limit the movement of the plunger to a position where it will exactly open the valve means 40 in a manner now to be described.

A slot 156 is defined in the actuating plunger 140 which receives a roll pin 158 attached to a cap 160 fixed by screw 162 to a substantially cylindrical valve member 164 rotatably carried by a sleeve 166 within the head assembly 120 in the path of the passageway 32. A diametrical aperture 168 is defined in the valve member 164 with its outlet end 170 decreased in size to permit quick and accurate aligning of the same with an outlet aperture 172 defined in the sleeve 166 and in communication with the outlet end 34 of the passageway 32. An enlarged aperture 174 is also defined in the sleeve 166 and a set screw 176 engages in a depression 178 in the sleeve 166 to permit accurate alignment of the apertures 172 and 174 with the passageway 32. An elongated slot 178 is defined in the head assembly 120 above the actuating plunger 140 in the vicinity of the roll pin 158 to provide forward and rearward limits on the movement of the roll pin.

Thus, it will be seen that forward movement of the actuating plunger 140 in response to engagement of the end 142 in a void 42 in the side edge of the sheet 24 will move the roll pin 158 and thereby rotate the valve member 164 to align the aperture 168 with the passageway 32 and permit feeding of the filling material from the reservoir 38 through the pump 44 into connecting conduits 180 to the outlet end 34 of the passageway 32 immediately in advance of the detecting means 30 whereby the void 42 is plugged.

Each detecting means 30 may be vertically aligned with a particular ply in the sheet 24 by an adjustable means including an adjusting stud 182 fixed in an aperture 184 of the connecting member 130 of the saddle 126 by a set screw 186 and slidably received in an additional support bar 188 overlying the saddles 126. Spring means 190 circumscribe the adjusting stud 182 between the additional support bar 188 and the connecting member 130 of the saddle 126. An adjusting nut 192 is threadably secured to the upper end of the adjusting stud 182 to provide for raising and lowering the saddles 126 on the side frame members 78 whereby the head assemblies 120 and thus the detection means 30 may be positioned in a desired vertical relationship.

The use and operation of the device of the instant invention will now be apparent. The width between the bed plates 46 is adjusted as described hereinabove by positioning the set collars 64 on the cross shaft 52 to accommodate a particular size sheet material 24 fed from a transporting means 26. The tension lever 72 is then moved to the position of FIGURE 7 to preset the urging of the bed plates 46 toward their adjusted spacing. Sheets are continually fed across the bed plates 46 after the saddles have been vertically positioned by rotation of the adjusting nut 192 to align the detection means 30 with individual intermediate plies in the sheets 24. It will be readily understood that as many detection means as there are plies may be provided along each side edge of the sheet material. The tension bar 102 is preset to urge the pressure rollers 96 downwardly whereby the edges of the sheet material are held down against the bed plates 46. Upon engaging a void 42, the detection means 30 actuates the valve means 40 to feed filling material through the passageway 32 to plug the same.

It will now be seen that there is herein provided an improved device for detecting and filling voids in the side edges of plywood or other sheet material which satisfies all of the objectives of the instant invention, and others, including many advantages of great practical utility and commercial importance.

Since many embodiments may be made of this inventive concept, and since many modifications may be made of the embodiments hereinbefore shown and described, it will be understood that all matter herein is to be interpreted merely as illustrative, and not in a limiting sense.

I claim:

1. A device for detecting and filling voids in the side edges of a plywood sheet comprising a support means across which said plywood sheet is urged, at least one void detection means carried by said support means in juxtaposition to one side edge of said sheet, passageway means formed in said support means, said passageway means having an outlet aligned with and in advance of said detection means in the direction of movement of the sheet, an inlet connected to a source of filling material, valve means interposed in said passageway means and movable from a closed position to an opened position in response to the detection of a void in the side edge of the sheet by said detection means, feeding means constantly delivering a quantity of said filling material to said inlet of said passageway means, and wherein said detection means includes a head assembly slidably carried by said support means, tension means normally urging said head assembly toward the side edge of the sheet, an actuating plunger slidably carried in said head assembly having one end dimensioned to be received in a void in the edge of the sheet, spring means normally urging said one end of said actuating plunger toward the side edge of the sheet, a transverse slot defined in said actuating plunger, said valve means including a rotatable, substantially cylindrical valve member having a diametrical aperture defined therethrough, a cap fixed to one end of said valve member, a roll pin secured to said cap in parallel spaced relationship to the longitudinal axis of said valve member, said roll pin being received in said slot of said actuating plunger, movement of said actuating plunger in response to the detection of a void in the side edge of the sheet causing movement of said roll pin and rotation of said valve member to align one end of said aperture with said passageway and the other end of said aperture with said feeding means.

2. The structure of claim 1 further including adjusting means operatively connected to said head assembly to raise and lower the same whereby said detection means may be aligned with a particular ply in the sheet.

3. The structure of claim 1 wherein said one end of said actuating plunger includes an inclined cam surface on its rearward edge in the direction of movement of the sheet to retract said actuating plunger as the void in the edge of the sheet passes by said one end.

4. A device for detecting and filling voids in the side edges of a plywood sheet comprising a support means slidably engageable by said plywood sheet as said plywood sheet is moved in one direction proximate and relative to said device, at least one void detection means carried by said support means in juxtaposition to one side edge of said plywood sheet, passageway means formed in said support means, said detection means being movable in one direction relative to said support means upon detection of a void in said one side edge of said plywood sheet, said passageway means having an outlet aligned with and in advance of said detection means in the direction of movement of said sheet, a passageway inlet connected to a source of filling material, normally closed valve means carried on said support means and interposed in said passageway means, mechanical means connecting said detection means with said valve means to actuate said valve means for movement from its said closed position to its open position in response to the movement of said detection means in the detection of a void in the side edge of said plywood sheet, feeding means constantly delivering a quantity of said filling material to said inlet of said passageway means;

hold down means to maintain the side edges of the plywood sheet against said portion of said support means over which said sheet is urged;

said hold down means including a support bar juxtaposed to the edge of said sheet, a plurality of pivot arms carried by said support bar in spaced relationship in the direction of movement of said sheet, a pressure wheel rotatably carried by each pivot arm in overlying relationship to the side edge of said sheet, and tension means normally urging said pressure wheel against said sheet to maintain said sheet in sliding contact with said support means;

each of said pivot arms having a substantially L-shaped configuration including a substantially horizontally extending leg and a substantially vertically extending leg meeting at a vertex, said pivot arms being pivotally secured to said support bar adjacent the end of said horizontally extending leg remote from the vertices, said pressure wheel being rotatably secured to their respective pivot arms adjacent said vertices, slots defined in the end of said vertically extending legs remote from said vertices, said tension means including an elongated tension bar received in all of said slots in said vertically extending legs of said pivot arms, and spring means carried by said tension bar urging each of said vertically extending legs downwardly about the pivotal connections of said horizontally extending legs to said support bar.

5. The structure of claim 4 wherein said tension bar is adjustably supported whereby it may be moved along its longitudinal axis to vary the tension behind said last-mentioned spring means.

References Cited

UNITED STATES PATENTS

| 401,771 | 4/1889 | Bain | 118—2 |
|---|---|---|---|
| 2,828,714 | 4/1958 | Sandberg | 118—2 |
| 1,756,998 | 5/1930 | Walker. | |
| 2,243,333 | 5/1941 | Diescher | 118—2 X |
| 3,071,106 | 1/1963 | Burelbach et al. | 118—8 X |

CHARLES A. WILLMUTH, *Primary Examiner.*

J. P. McINTOSH, *Assistant Examiner.*